US012067918B2

(12) United States Patent
Ban et al.

(10) Patent No.: US 12,067,918 B2
(45) Date of Patent: *Aug. 20, 2024

(54) DISPLAY DEVICE

(71) Applicant: Samsung Display Co., Ltd., Yongin-Si (KR)

(72) Inventors: Seok Gyu Ban, Yongin-si (KR); Kyung Man Kim, Yongin-si (KR); Sang Jae Yeo, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,913

(22) Filed: Jun. 5, 2023

(65) Prior Publication Data

US 2023/0306887 A1 Sep. 28, 2023

Related U.S. Application Data

(63) Continuation of application No. 17/711,988, filed on Apr. 1, 2022, now Pat. No. 11,705,040, which is a continuation of application No. 16/848,763, filed on Apr. 14, 2020, now Pat. No. 11,308,837.

(30) Foreign Application Priority Data

Sep. 24, 2019 (KR) ........................ 10-2019-0117670

(51) Int. Cl.
*G09G 3/20* (2006.01)

(52) U.S. Cl.
CPC ........... *G09G 3/20* (2013.01); *G09G 2310/06* (2013.01); *G09G 2320/029* (2013.01); *G09G 2320/043* (2013.01)

(58) Field of Classification Search
CPC ................. G09G 3/20; G09G 2310/06; G09G 2320/029; G09G 2320/043
See application file for complete search history.

(56) References Cited

U.S. PATENT DOCUMENTS

| | | | |
|---|---|---|---|
| 7,423,617 | B2 | 9/2008 | Giraldo et al. |
| 7,714,758 | B2 | 5/2010 | Ko et al. |
| 8,004,479 | B2 | 8/2011 | White et al. |

(Continued)

FOREIGN PATENT DOCUMENTS

| | | | |
|---|---|---|---|
| CN | 1711479 | A | 12/2005 |
| CN | 101316103 | A | 12/2008 |

(Continued)

*Primary Examiner* — Kenneth B Lee, Jr.
(74) *Attorney, Agent, or Firm* — Innovation Counsel LLP

(57) ABSTRACT

A display device includes a data line, a pixel electrically connected to the data line, a data driver for outputting a data voltage, and a transmitter electrically connected between an output terminal of the data driver and the data line. The transmitter may transmit an instance of the data voltage to the data line in a first period. The transmitter may amplify a second instance of the data voltage to generate a reference voltage and then transmit the reference voltage to the data line in a second period different from the first period. The pixel includes a light emitting element for emitting light in response to the first instance of the data voltage. A voltage level of the reference voltage may be higher than a voltage level of the data voltage.

16 Claims, 7 Drawing Sheets

(56) References Cited

U.S. PATENT DOCUMENTS

| | | | | |
|---|---|---|---|---|
| 8,564,510 | B2 | 10/2013 | Min et al. | |
| 9,148,930 | B2 | 9/2015 | Chung et al. | |
| 10,217,413 | B2 | 2/2019 | Lee et al. | |
| 10,580,356 | B2 | 3/2020 | An et al. | |
| 10,755,662 | B2 | 8/2020 | Kong et al. | |
| 11,308,837 | B2 * | 4/2022 | Ban ...................... | G09G 3/3291 |
| 2009/0284317 | A1 | 11/2009 | Lee | |
| 2010/0188320 | A1 * | 7/2010 | Min ..................... | G09G 3/3291<br>345/80 |
| 2010/0225676 | A1 | 9/2010 | Nishimura | |
| 2012/0261557 | A1 | 10/2012 | Sugita et al. | |
| 2019/0139492 | A1 | 5/2019 | Chen et al. | |

FOREIGN PATENT DOCUMENTS

| | | | |
|---|---|---|---|
| CN | 101582248 | A | 11/2009 |
| CN | 102630313 | A | 8/2012 |
| CN | 103871356 | A | 6/2014 |
| CN | 108074524 | A | 5/2018 |
| CN | 108831372 | A | 11/2018 |
| CN | 109712566 | A | 5/2019 |
| JP | 2011154386 | A | 8/2011 |
| KR | 10-1270188 | B1 | 6/2013 |
| KR | 10-1560419 | B1 | 10/2015 |
| KR | 10-1634286 | B1 | 7/2016 |
| KR | 10-2017-0061784 | A | 6/2017 |
| KR | 10-1818241 | B1 | 1/2018 |
| KR | 10-2018-0036298 | A | 4/2018 |

* cited by examiner

DISPLAY DEVICE

CROSS-REFERENCE TO RELATED APPLICATIONS

The present application is a continuation application of U.S. patent application Ser. No. 17/711,988 filed on Apr. 1, 2022, which is a continuation application of U.S. patent application Ser. No. 16/848,763 filed on Apr. 14, 2020 (now U.S. Pat. No. 11,308,837), which claims priority under 35 U.S.C. § 119(a) to Korean patent application number 10-2019-0117670 filed on Sep. 24, 2019 in the Korean Intellectual Property Office; the prior applications are incorporated by reference.

BACKGROUND

1. Technical Field

The technical field relates to a display device.

2. Related Art

A display device typically includes a display panel and a driver. The display panel includes scan lines, data lines, and pixels. The driver includes a scan driver configured to sequentially provide scan signals to the scan lines and includes a data driver configured to provide data signals to the data lines. Each of the pixels emits light with a luminance corresponding to a data signal provided through a corresponding data line in response to a scan signal provided through a corresponding scan line.

The display device displays an image through the pixels. Each of the pixels includes a light emitting element and a driving transistor configured to provide a driving current to the light emitting element.

The display device may sense mobility information of a driving transistor or degradation information of a light emitting element, in order to compensate for degradation or characteristic change (e.g., characteristic change according to temperature) of a pixel.

SUMMARY

In order to sense mobility information of the driving transistor or degradation information of the light emitting element, a test voltage (or reference voltage) is applied to the pixel through the corresponding data line from the data driver. The test voltage is set higher than an operating point of the light emitting element.

In general, the test voltage is limited to a voltage level within an output range of the data driver. If the test voltage is not set sufficiently higher than the operating point of the light emitting element, the degradation information of the light emitting element may not be accurately sensed.

The output range of the data driver may be increased, but resolution (or grayscale expression) of a displayed image may relatively decrease. In addition, power consumption of the data driver may increase.

Embodiments may be related to a display device capable of accurately sensing degradation information of a light emitting element while minimizing or preventing an increase in power consumption of a data driver and a decrease in image resolution.

According to an embodiment, a display device may include the following elements: a display including a data line and a pixel connected to the data line; a data driver configured to output a data voltage; and a transmitter connected between an output terminal of the data driver and the data line, the transmitter transmitting the data voltage to the data line in a first period, the transmitter amplifying the data voltage and then transmitting the amplified data voltage as a reference voltage to the data line in a second period different from the first period, wherein the pixel includes a light emitting element emitting light in response to the data voltage, wherein the reference voltage has a voltage level higher than a voltage level of the data voltage.

The light emitting element may emit light in the first period, and may emit no light in the second period.

The reference voltage may be about 1.5 times to about 2.5 times of a maximum voltage level of the data voltage.

The transmitter may include: an amplifier connected between the output terminal of the data driver and the data line; and a bypass switch connected in parallel to the amplifier.

A gain of the amplifier may be about 2. The amplifier may amplify the data voltage by about 2 times of the maximum voltage level of the data voltage.

The bypass switch may be turned on in the first period, and be turned off in at least a portion of the second period.

The display device may further include a sensor. The display may further include a readout line connected to the sensor. The readout line may be connected to a first electrode of the light emitting element. Characteristic information of the light emitting element may be output to the sensor through the readout line in the second period.

The display may further include a first power line, a second power line, a scan line, a sensing control line, and a readout line. The pixel may further include: a first transistor including a first electrode connected to the first power line, a second electrode connected to a second node, and a gate electrode connected to a first node; a second transistor including a first electrode connected to the data line, a second electrode connected to the first node, and a gate electrode connected to the scan line; a third transistor including a first electrode connected to the first node, a second electrode connected to the readout line, and a gate electrode connected to the sensing control line; and a capacitor connected between the first node and the second node.

The second period may include a first sub-period, a second sub-period, and a third sub-period in sequence. In the first sub-period, a gate-on voltage may be applied to the scan line, a gate-on voltage may be applied to the sensing control line, the bypass switch may be turned off, and an initialization voltage may be applied to the readout line.

In the second sub-period, a gate-off voltage may be applied to the sensing control line.

In the second sub-period, a node voltage of the second node may be changed from a voltage level of the initialization voltage to a voltage level of a threshold voltage of the light emitting element.

In the third sub-period, a gate-off voltage may be applied to the scan line, and a gate-on voltage may be applied to the sensing control line.

In the third sub-period, the bypass switch may be turned on.

In the third sub-period, the bypass switch may be turned off.

The light emitting element may include a first electrode, a first organic emitting layer disposed on the first electrode, and a second electrode disposed on the first organic emitting layer.

The light emitting element may further include a second organic emitting layer disposed between the first organic emitting layer and the second electrode.

According to an embodiment, a display device may include the following elements: a display including a data line and a pixel connected to the data line; a data driver configured to output a data voltage; and a transmitter connected between an output terminal of the data driver and the data line, wherein the pixel includes a light emitting element emitting light in response to the data voltage, wherein the transmitter includes: an amplifier connected between the output terminal of the data driver and the data line; and a bypass switch connected in parallel to the amplifier.

The transmitter may transmit the data voltage to the data line through the bypass switch in a first period, and amplify the data voltage through the amplifier and then transmit the amplified data voltage as a reference voltage to the data line in a second period different from the first period. The reference voltage may have a voltage level higher than a voltage level of the data voltage.

The light emitting element may emit light in the first period, and may emit no light in the second period.

The display device may further include a sensor. The display may further include a readout line connected to the sensor. The readout line may be connected to a first electrode of the light emitting element. Characteristic information of the light emitting element may be output to the sensor through the readout line in the second period.

An embodiment may be related to a display device. The display device may include a data line, a pixel electrically connected to the data line, a data driver for outputting a data voltage, and a transmitter electrically connected between an output terminal of the data driver and the data line. The transmitter may transmit an instance of the data voltage to the data line in a first period. The transmitter may amplify a second instance of the data voltage to generate a reference voltage and then transmit the reference voltage to the data line in a second period different from the first period. The pixel includes a light emitting element for emitting light in response to the first instance of the data voltage. A voltage level of the reference voltage may be higher than a voltage level of the data voltage.

The light emitting element emits light in the first period and emits no light in the second period.

The voltage level of the reference voltage may be in a range of about 1.5 times of a maximum voltage level of the data voltage to about 2.5 times of the maximum voltage level of the data voltage.

The transmitter may include an amplifier and a bypass switch electrically connected in parallel between the output terminal of the data driver and the data line.

A gain of the amplifier may be about 2. The amplifier amplifies the second instance of the data voltage by about 2 times of a maximum voltage level of the data voltage.

The bypass switch may be turned on in the first period and may be turned off in at least a portion of the second period.

The display device may include a sensor and a readout line electrically connected to the sensor. The readout line may be connected to a first electrode of the light emitting element. Characteristic information of the light emitting element may be output to the sensor through the readout line in the second period.

The display device may include a first power line, a second power line, a scan line, a sensing control line, and a readout line. The pixel may include the following elements: a first transistor including a first electrode electrically connected to the first power line, a second electrode electrically connected to a second node, and a gate electrode electrically connected to a first node; a second transistor including a first electrode electrically connected to the data line, a second electrode electrically connected to the first node, and a gate electrode electrically connected to the scan line; a third transistor including a first electrode electrically connected to the first node, a second electrode electrically connected to the readout line, and a gate electrode electrically connected to the sensing control line; and a capacitor electrically connected between the first node and the second node.

The second period may include a first sub-period, a second sub-period, and a third sub-period in sequence. In the first sub-period, a gate-on voltage may be applied to the scan line, a gate-on voltage may be applied to the sensing control line, the bypass switch may be turned off, and an initialization voltage may be applied to the readout line.

In the second sub-period, a gate-off voltage may be applied to the sensing control line.

In the second sub-period, a node voltage of the second node may be changed from a voltage level of the initialization voltage to a voltage level of a threshold voltage of the light emitting element.

In the third sub-period, a gate-off voltage may be applied to the scan line, and a gate-on voltage may be applied to the sensing control line.

In the third sub-period, the bypass switch may be turned on.

In the third sub-period, the bypass switch may be turned off.

The light emitting element may include a first electrode, a second electrode overlapping the first electrode, and a first organic emitting layer disposed between the first electrode and the second electrode.

The light emitting element may include a second organic emitting layer disposed between the first organic emitting layer and the second electrode.

An embodiment may be related to a display device. The display device may include a data line, a pixel electrically connected to the data line, a data driver configured to output a data voltage, and a transmitter electrically connected between an output terminal of the data driver and the data line. The pixel may include a light emitting element emitting light in response to a first instance of the data voltage. The transmitter may include an amplifier and a bypass switch electrically connected in parallel between the output terminal of the data driver and the data line.

The transmitter may transmit the first instance of the data voltage to the data line through the bypass switch in a first period. The transmitter may amplify a second instance of the data voltage through the amplifier to generate a reference voltage and then transmit the reference voltage to the data line in a second period different from the first period. A voltage level of the reference voltage may be higher than a voltage level of the data voltage.

The light emitting element emits light in the first period and emits no light in the second period.

The display device may include a sensor and a readout line electrically connected to the sensor. The readout line may be connected to a first electrode of the light emitting element. Characteristic information of the light emitting element may be output to the sensor through the readout line in the second period.

DETAILED DESCRIPTION

Figure 1A:
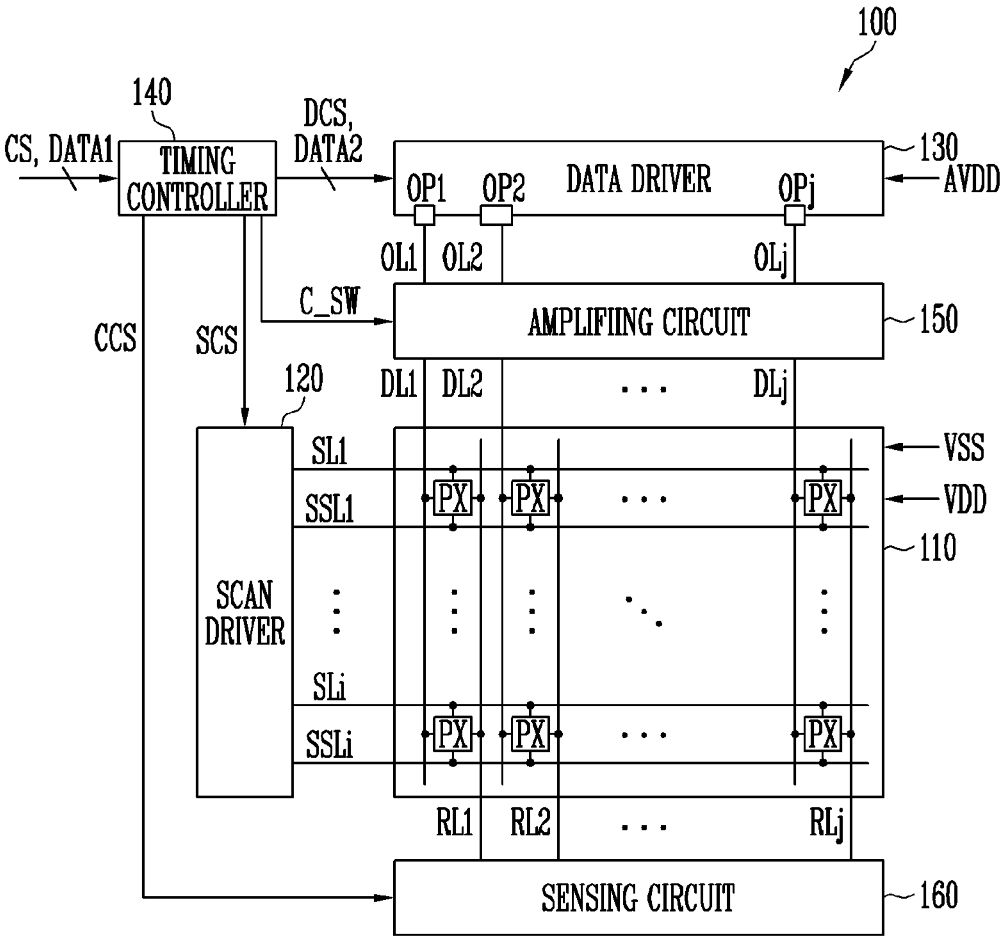
FIG. 1A is a block diagram illustrating a display device according to example embodiments.

Example embodiments are described reference to the accompanying drawings.

In the drawing figures, dimensions may be exaggerated for clarity of illustration. Like reference numerals may refer to like elements.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

A voltage may mean an instance of the voltage. The term "connect" may mean "electrically connect." The term "insulate" may mean "electrically insulate" or "electrically isolate." A first electrode of a transistor may mean a source electrode of the transistor; a second electrode of the transistor may mean a drain electrode of the transistor.

Figure 1B:
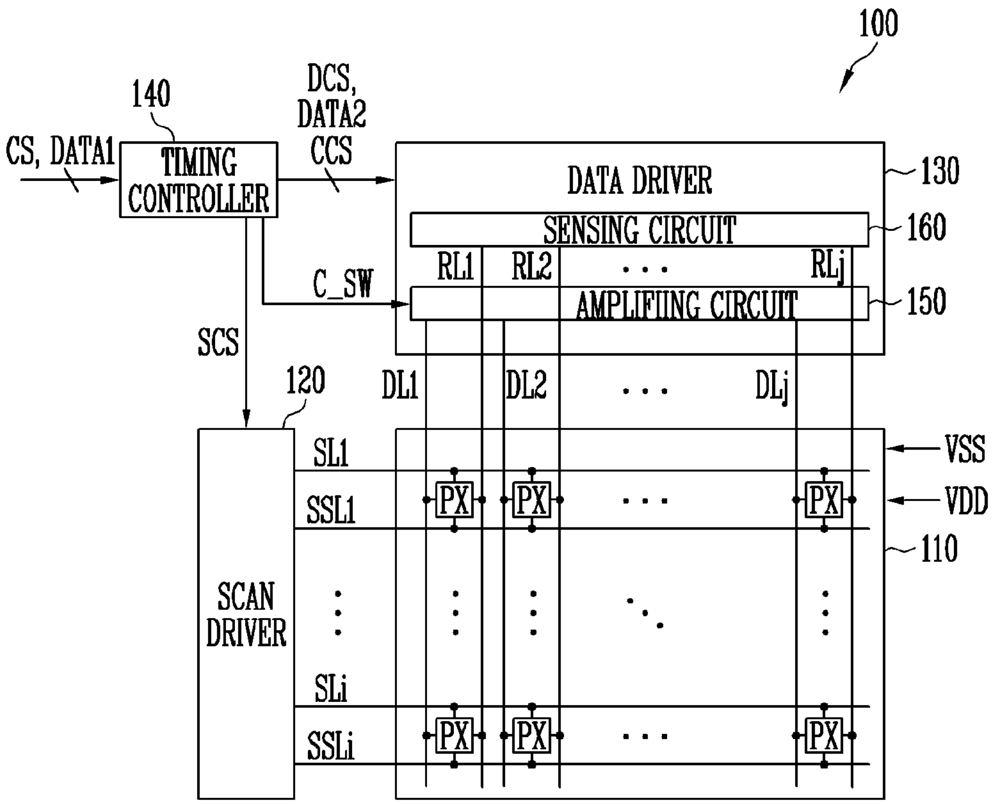
FIG. 1B is a block diagram illustrating an example of the display device shown in FIG. 1A.

FIG. 1A is a block diagram illustrating a display device according to example embodiments. FIG. 1B is a block diagram illustrating an example of the display device shown in FIG. 1A.

Referring to FIG. 1A, the display device 100 may include a display 110 (or display panel 110), a scan driver 120 (or gate driver 120), a data driver 130 (or source driver 130), a timing controller 140, a transmitter 150 (or transmission/amplifying circuit 150), and a sensor 160 (or sensing circuit 160).

The display 110 may include scan lines SL1 to SLi (i is a positive integer), data lines DL1, DL2 to DLj (j is a positive integer), and pixels PX. The display 110 may further include sensing control lines SSL1 to SSLi and sensing lines (or readout lines) RL1, RL2 to RLj.

The pixels PX may be disposed in regions (e.g., pixel regions) defined by the scan lines SL1 to SLi and the data lines DL1 to DLj.

A pixel PX may be electrically connected to one of the scan lines SL1 to SLi and one of the data lines DL1 to DLj. The pixel PX may be electrically connected to one of the sensing control lines SSL1 to SSLi and one of the sensing lines RL1 to RLj. The pixel PX may include a light emitting element and at least one transistor for providing a driving current to the light emitting element.

The pixel PX may emit light with a luminance corresponding to a data voltage (or data signal) provided through a data line in response to a scan signal provided through a scan line. The pixel PX may output characteristic information (or degradation information, e.g., a sensing voltage) of the light emitting element through a sensing line (or readout line) in response to a sensing signal provided through a sensing control line.

A detailed configuration and operation of the pixel PX are described with reference to FIG. 2.

A first power voltage VDD and a second power voltage VSS may be provided to the display 110. The power voltages VDD and VSS are voltages necessary for an operation for the pixel PX, and the first power voltage VDD may have a voltage level higher than a voltage level of the second power voltage VSS. The power voltages VDD and VSS may be provided to the display 110 from a separate power supply.

The scan driver 120 may generate scan signals based on a scan control signal SCS, and sequentially provide the scan signals to the scan lines SL1 to SLi. The scan control signal SCS may include a start signal (or start pulse), clock signals, and the like, and may be provided from the timing controller 140. For example, the scan driver 120 may include shift registers (or stages) configured to sequentially generate and output scan signals in the form of pulses, which correspond to the start signal (in the form of a pulse) using the clock signals.

The scan driver 120 may further generate a sensing control signals similar to the scan signals, and may provide the sensing control signals to the sensing lines SSL1 to SSLi.

The data driver 130 may generate data voltages (or data signals) based on image data DATA2 and a data control signal DCS, and may output the data voltages through output terminals OP1, OP2 to OPj. The data control signal DCS is a signal for controlling an operation of the data driver 130, and may include a load signal (or data enable signal) for instructing output of a valid data signal, and the like.

In an example embodiment, the data driver 130 may generate a data voltage corresponding to a data value (or grayscale value/data) included in the image data DATA2 using gamma voltages. The gamma voltages may be generated from the data driver 130 or may be provided from a separate gamma voltage generating circuit (e.g., a gamma integrated circuit). For example, the data driver 130 may select one of the gamma voltages based on the data value, and may output the selected gamma voltage as a data voltage.

A driving voltage AVDD (or driving power) may be provided to the data driver 130. The driving voltage AVDD may be a voltage necessary for an operation of the data driver 130. For example, the data driver 130 may generate gamma voltages by dividing the driving voltage AVDD. The driving voltage AVDD may be provided from a separate power supply (e.g., a T-con board on which the timing controller 140 is mounted).

In an example embodiment, the data driver 130 may output a data voltage (or first data voltage) in a first period, and output a first reference voltage (or second data voltage) in a second period different from (e.g., subsequent to) the first period. The first period (or display period) may be a period in which the pixel PX emits light and/or a period in which a valid data voltage that allows the pixel PX to emit light is applied (or written) to the pixel PX. The second period (or sensing period) may be a period in which a characteristic of the light emitting element in the pixel PX is sensed, and the pixel PX may emit no light in the second period. The first reference voltage is a voltage for sensing a characteristic of the light emitting element in the pixel PX, and has a voltage level equal to a maximum voltage level (i.e., a maximum data voltage) within a voltage range of the data voltage or correspond to the maximum voltage level.

The transmitter 150 may be connected between the data driver 130 and the data lines DL1 to DLj. For example, the transmitter 150 may be connected between output lines OL1 to OLj (respectively connected to the output terminals OP1 to OPj of the data driver 130) and the data lines DL1 to DLj. The transmitter 150 may connect the output lines OL1 to OLj one-to-one to the data lines DL1 to DLj.

In some example embodiments, the transmitter 150 may transmit the data voltages provided from the data driver 130 in the first period to the data lines DL1 to DLj, amplify the first reference voltages provided from the data driver 130 in the second period to generate amplified first reference voltages, and provide the amplified first reference voltages, i.e., second reference voltages (or reference voltages) to the data lines DL1 to DLj. For example, in the first period, the transmitter 150 may receive a data voltage provided through a first output line OL1, and may transmit the data voltage to the first data line DL1. For example, in the second period, the transmitter 150 may generate a second reference voltage by amplifying a first reference voltage provided through the first output line OL1, and may provide the second reference voltage to the first data line DL1. A voltage level of the second reference voltage may be in a range of about 1.5 times of a voltage level of the first reference voltage to about 3 times the voltage level of the first reference voltage. A voltage level of the second reference voltage may be about 2 times of a voltage level of the first reference voltage. That is, the transmitter 150 may amplify the first reference voltage by about 1.5 to 3 times or about 2 times.

Since the first reference voltage is amplified by the transmitter 150, the second reference voltage (or reference voltage) may be set sufficiently higher than an operating point (or threshold voltage) of the light emitting element of the pixel PX, even when the voltage range of the data voltage is relatively narrow (i.e., even when the difference between the maximum voltage level within the voltage range of the data voltage and the operating point of the light emitting element is not large).

When the light emitting element in the pixel PX is degraded, the operating point of the light emitting element is increased, and accordingly, the difference between the maximum voltage level (or first reference voltage) within the voltage range of the data voltage and the operating point of the light emitting element may be decreased. If the display device 100 senses a characteristic of the light emitting element by applying the first reference voltage to the pixel PX, sensing accuracy may be deteriorated as time elapses. According to embodiments, the display device 100 (and the transmitter 150) sets the second reference voltage to be sufficiently higher than the operating point of the light emitting element by amplifying the first reference voltage, so that deterioration of the sensing accuracy can be prevented.

The second reference voltage may be increased by changing (or increasing) the driving voltage AVDD provided to the data driver 130. However, the resolution of the data driver 130 may be deteriorated, and the power consumption of the data driver 130 may be increased. For example, the range of the valid data voltage with respect to the driving voltage AVDD may be decreased, and gamma voltages used as the valid data voltage among the gamma voltages may be decreased. Accordingly, resolution (or grayscale expression) may be deteriorated. Thus, the display device 100 amplifies the first reference voltage by using the transmitter 150 in the second period, without changing the driving voltage AVDD, and advantageously, an increase in power consumption and deterioration of the resolution can be reduced or prevented.

A detailed configuration and operation of the transmitter 150 are described with reference to FIG. 4.

The timing controller 140 may receive input image data DATA1 and a control signal CS from an external device (e.g., a graphic processor), generate the scan control signal SCS and the data control signal DCS, based on the control signal CS, and generate the image data DATA2 by converting the input image data DATA1. The control signal CS may include a vertical synchronization signal, a horizontal synchronization signal, a clock, and the like. For example, the timing controller 140 may convert the input image data DATA1 into the image data DATA2 having a format available in the data driver 130.

The timing controller 140 may generate a switch control signal C_SW, and provide the switch control signal C_SW to the transmitter 150. The transmitter 150 may transmit (bypass an amplifier) or amplify the data voltage, based on the switch control signal C_SW.

The timing controller 140 may generate a compensation control signal CCS, based on the control signal CS. The compensation control signal CCS may be provided to the sensor 160.

The sensor 160 may sense a characteristic of a light emitting element in the pixel PX through one of the sensing lines RL1 to RLj. For example, the sensor 160 may detect a sensing value (sensing voltage or characteristic information) corresponding to the characteristic of the light emitting element through one of the sensing lines RL1 to RLj.

The sensing value may be provided from the sensor 160 to the data driver 130, and the data driver 130 may generate a data voltage based on the sensing value. For example, the data driver 130 may change or compensate for the data voltage based on a variation of the sensing value. That is, the data voltage may be compensated based on a change in characteristic of the light emitting element.

In embodiments, the sensing value may be provided to the timing controller 140, and the timing controller 140 may compensate for the image data DATA2 based on the sensing value.

As described with reference to FIG. 1A, the display device 100 amplifies a reference voltage for sensing a characteristic of the light emitting element through the transmitter 150 and provides the amplified reference voltage to the pixel PX, so that the accuracy in sensing a characteristic of the light emitting element can be improved while minimizing an increase in power consumption of the data driver 130 and minimizing deterioration of resolution.

At least one of the scan driver 120, the data driver 130, the timing controller 140, the transmitter 150, and the sensor 160 may be formed in the display 110, or be implemented as an IC and then mounted in a flexible printed circuit board to be connected to the display 110. At least two of the scan driver 120, the data driver 130, the timing controller 140, the transmitter 150, and the sensor 160 may be implemented as one IC. For example, as shown in FIG. 1B, the data driver 130 may include the transmitter 150 and the sensor 160.

Figure 2:
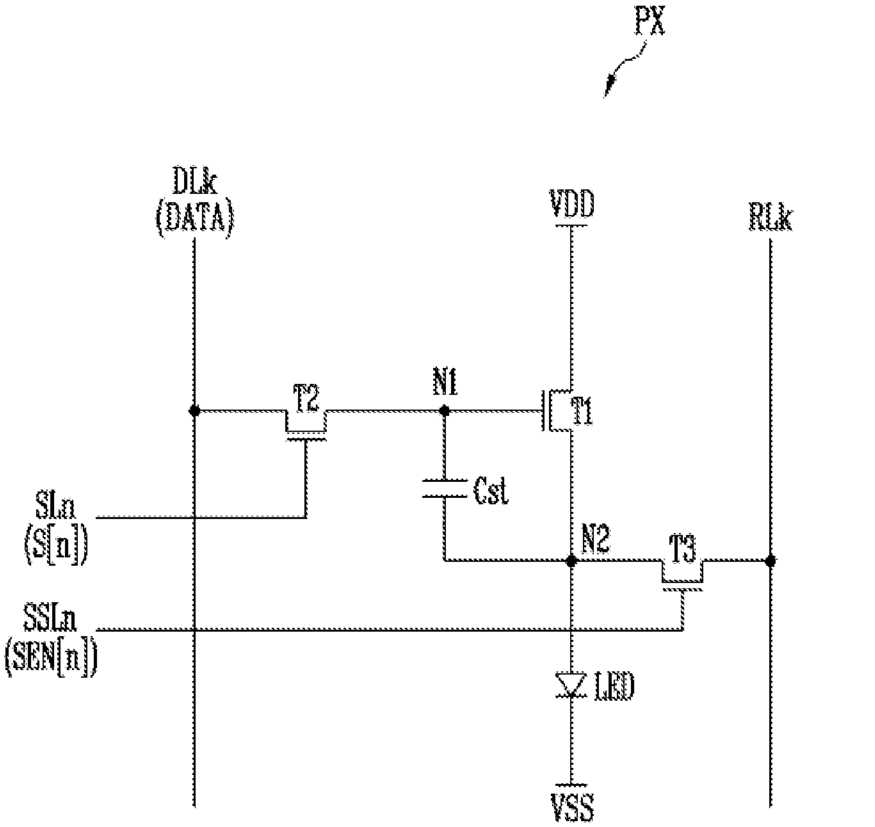
FIG. 2 is a circuit diagram illustrating an example of a pixel included in the display device shown in FIG. 1A.

FIG. 2 is a circuit diagram illustrating an example of a pixel included in the display device shown in FIG. 1A.

Referring to FIG. 2, the pixel PX may be connected to an nth scan line SLn, a kth data line DLk, an nth sensing control line SSLn, and a kth sensing line RLk (n and k are positive integers).

The pixel PX may include a light emitting element LED, a first transistor T1 (driving transistor), a second transistor T2 (switching transistor), a third transistor T3 (sensing transistor), and a storage capacitor Cst. Each of the first transistor T1, the second transistor T2, and the third transistor T3 may be a thin film transistor including an oxide semiconductor.

An anode electrode of the light emitting element LED may be connected to a second node N2 (or a second electrode of the first transistor T1), and a cathode electrode of the light emitting element LED may be connected to a second power line to which a second power voltage VSS is applied. The light emitting element LED may generate light with a predetermined luminance corresponding to an amount of current (or driving current) supplied from the first transistor T1. The light emitting element LED may be an organic light emitting diode or an inorganic light emitting diode.

A first electrode of the first transistor T1 may be connected to a first power line to which a first power voltage VDD is applied, and the second electrode of the first transistor T1 may be connected to the second node N2 (or the anode electrode of the light emitting element LED). A gate electrode of the first transistor T1 may be connected to a first node N1. The first transistor T1 controls an amount of current flowing through the light emitting element LED, corresponding to a voltage of the first node N1.

A first electrode of the second transistor T2 may be connected to the kth data line DLk, and a second electrode of the second transistor T2 may be connected to the first node N1. A gate electrode of the second transistor T2 may be connected to the nth scan line SLn. When a scan signal S[n] is supplied to the nth scan line SLn, the second transistor T2 may be turned on, to transmit a data voltage DATA (or data signal) from the kth data line DLk to the first node N1.

The storage capacitor Cst may be connected between the first node N1 and the anode electrode of the light emitting element LED. The storage capacitor Cst may store the voltage of the first node N1.

The third transistor T3 may be connected between the kth sensing line RLk and the second node N2 (or the second electrode of the first transistor T1). The third transistor T3 may connect the second node N2 and the kth sensing line RLk in response to a sensing signal SEN[n]. Therefore, a sensing voltage (or node voltage of the second node N2) may be provided to the kth sensing line RLk. In embodiments, a sensing current corresponding to the node voltage of the second node N2 may be transmitted to the kth sensing line RLk. The sensing voltage may be provided to the sensor 160 (see FIG. 1A) through the kth sensing line RLk.

Figure 3A:
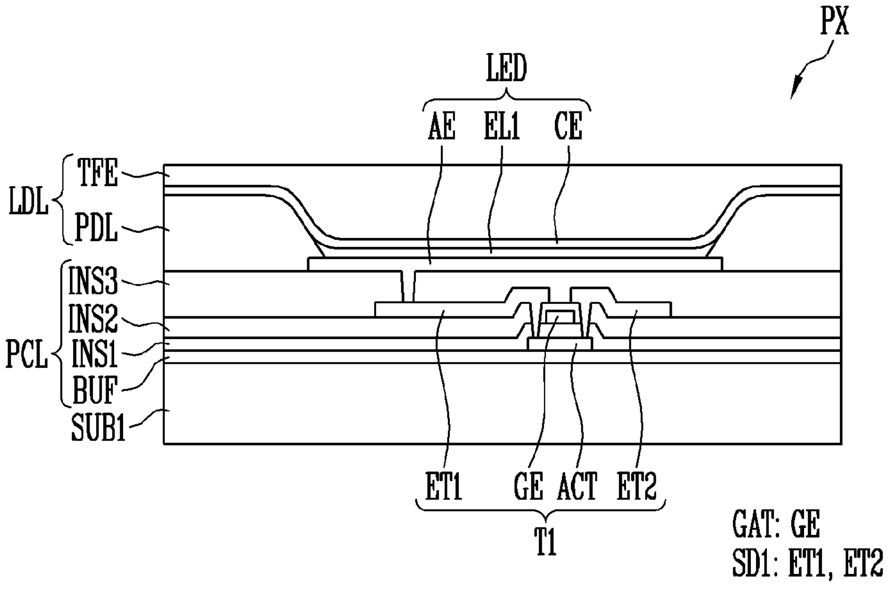
FIG. 3A and FIG. 3B are cross-sectional views illustrating examples of the pixel shown in FIG. 2.
Figure 3B:
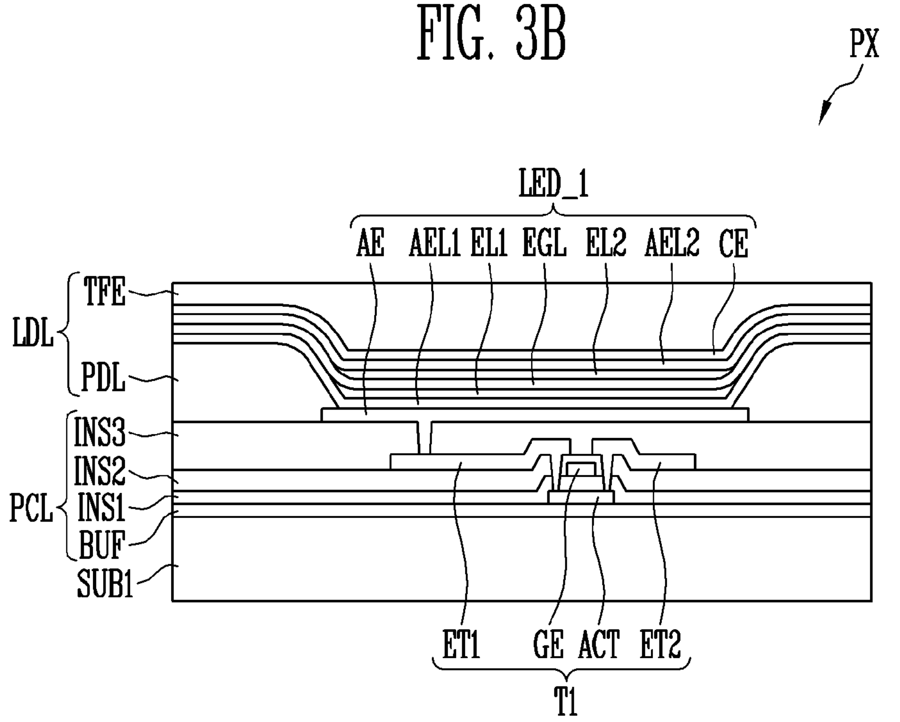

FIGS. 3A and 3B are cross-sectional views illustrating examples of the pixel shown in FIG. 2. The pixel PX may be represented by the first transistor T1 and the light emitting element LED shown in FIG. 2.

Referring to FIGS. 2 and 3A, the pixel PX may include a first substrate SUB1, a pixel circuit layer PCL, and a light emitting element layer LDL.

The first substrate SUB1 may be made of an insulative material (or insulating material) such as glass or resin. The first substrate SUB1 may be made of a material having flexibility to be bendable or foldable. The first substrate SUB1 may have a single- or multi-layered structure.

For example, the material having flexibility may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the first substrate SUB1 is not limited thereto. For example, the first substrate SUB1 may be made of a Fiber Reinforced Plastic (FRP), etc.

The pixel circuit layer PCL may be disposed on the first substrate SUB1, and include the transistors T1, T2, and T3, the storage capacitor Cst, and the lines SLn, DLk, SSLn, and RLk, which are described with reference to FIG. 2.

The pixel circuit layer PCL may include a buffer layer BUF, a semiconductor layer ACT, a first insulating layer INS1, a first conductive layer GAT, a second insulating layer INS2, a second conductive layer SD1, and a third insulating layer INS3. As shown in FIG. 3A, the buffer layer BUF, the semiconductor layer ACT, the first insulating layer INS1, the first conductive layer GAT, the second insulating layer INS2, the second conductive layer SD1, and the third insulating layer INS3 may be sequentially stacked on the first substrate SUB1.

The buffer layer BUF may be disposed on the entire surface of the first substrate SUB1. The buffer layer BUF may prevent diffusion of impurity ions, prevent penetration of moisture or external air, and may perform a surface planarization function. The buffer layer BUF may include silicon nitride, silicon oxide, silicon oxynitride, or the like. The buffer layer BUF may be optional according to a type or a process condition of the first substrate SUB1.

The semiconductor layer ACT may be disposed on the buffer layer BUF (or the first substrate SUB1). The semiconductor layer ACT may be an active layer forming a channel of the first transistor T1. The semiconductor layer ACT may include a source region and a drain region, which are in contact with a first transistor electrode ET1 (or source electrode) and a second transistor electrode ET2 (or drain electrode), which will be described later. A region between the source region and the drain region may be a channel region.

The semiconductor layer ACT may include an oxide semiconductor. The channel region is a semiconductor pattern/region not doped with an impurity, and may be an intrinsic semiconductor. The source region and the drain region may be semiconductor regions doped with impurity. An n-type impurity may be used as the impurity.

The first insulating layer INS1 (or gate insulating layer) may be disposed on the semiconductor layer ACT and the buffer layer BUF (or the first substrate SUB1). The first insulating layer INS1 may be disposed throughout approximately the entire upper surface of the first substrate SUB1. The first insulating layer INS1 may be a gate insulating layer having a gate insulating function.

The first insulating layer INS1 may include an inorganic insulating material such as a silicon compound or metal oxide. For example, the first insulating layer INS1 may include silicon oxide, silicon nitride, silicon oxynitride, aluminum oxide, tantalum oxide, hafnium oxide, zirconium oxide, titanium oxide, or any combination thereof. The first insulating layer INS1 may be a single layer or a multi-layer structure including stacked layers made of different materials.

The first conductive layer GAT may be disposed on the first insulating layer INS1. The first conductive layer GAT may include a gate electrode GE. The gate electrode GE may overlap the semiconductor layer ACT (or semiconductor member).

The first conductive layer GAT may further include one electrode of the storage capacitor Cst, the kth sensing line RLk (or readout line), the nth scan line SLn, and the nth sensing control line SSLn, which are described with reference to FIG. 2.

The first conductive layer GAT may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (T1), tantalum (Ta), tungsten (W), and copper (Cu). The first conductive layer GAT may have a single-layered or multi-layered structure.

The second insulating layer INS2 (or interlayer insulating layer) may be disposed on the first conductive layer GAT, and be disposed throughout approximately the entire surface of the first substrate SUB1. The second insulating layer INS2 functions to insulating the first conductive layer GAT and the second conductive layer SD1 from each other, and may be an interlayer insulating layer.

The second insulating layer INS2 may include an inorganic insulating material such as silicon oxide, silicon nitride, silicon oxynitride, hafnium oxide, aluminum oxide, titanium oxide, tantalum oxide, or zinc oxide, or an organic insulating material such as polyacrylates resin, epoxy resin, phenolic resin, polyamides resin, unsaturated polyesters resin, polyphenylenethers resin, polyphenylenesulfides resin, or benzocyclobutene (BCB). The second insulating layer INS2 may be a single layer or a multi-layer structure including stacked layers made of different materials.

The second conductive layer SD1 may be disposed on the second insulating layer INS2. The second conductive layer SD1 may include the first transistor electrode ET1 and the second transistor electrode ET2.

The first transistor electrode ET1 may overlap a partial region (e.g., the source region) of the semiconductor layer ACT, and be connected to a partial region of the semiconductor layer ACT, which is exposed through a contact hole. The first transistor electrode ET1 may constitute the first electrode of the first transistor T1.

Similarly, the second transistor electrode ET2 may overlap a partial region (e.g., the drain region) of the semiconductor layer ACT, and be connected to a partial region of the semiconductor layer ACT, which is exposed through a contact hole. The second transistor electrode ET2 may constitute the second electrode of the first transistor T1.

Similarly to the first conductive layer GAT, the second conductive layer SD1 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (T1), tantalum (Ta), tungsten (W), and copper (Cu). The second conductive layer SD1 may have a single-layered or multi-layered structure.

The third insulating layer INS3 (or protective layer) may be disposed on the second conductive layer SD1.

The light emitting element layer LDL may be disposed on the pixel circuit layer PCL. The light emitting element layer LDL may include a light emitting element LED and an encapsulation layer TFE.

The light emitting element LED may include an anode electrode AE (or lower electrode), a cathode electrode CE (or upper electrode), and a first emitting layer EL1 (or intermediate layer). The light emitting element LED may further include a pixel defining layer PDL.

The anode electrode AE may be disposed on the third insulating layer INS3, and overlap with the first transistor electrode ET1. The anode electrode AE may be connected to the first transistor electrode ET1 through a via hole penetrating the third insulating layer INS3.

The pixel defining layer PDL may be disposed along an edge of the anode electrode AE, and include an organic insulating material.

The first emitting layer EL1 may be disposed on the top of the anode electrode AE exposed by the pixel defining layer PDL. The first emitting layer EL1 may include a low molecular material or high molecular material.

The cathode electrode CE may be disposed on the first emitting layer ELL The cathode electrode CE may be entirely formed on the first emitting layer EL1 and the pixel defining layer PDL. The cathode electrode CE may be a transparent or translucent electrode.

The encapsulation layer TFE may be disposed on the cathode electrode CE. The encapsulation layer TFE may prevent moisture and air, which may be introduced from the environment, from penetrating into the light emitting element LED. The encapsulation layer TFE may be a thin film encapsulation, and may include at least one organic layer and at least one inorganic layer. For example, the organic layer may include at least one selected from the group consisting of epoxy, acrylate, and urethane acrylate, and the inorganic layer may include at least one selected from the group consisting of silicon oxide (SiOx), silicon nitride (SiNx), and silicon oxynitride (SiONx).

An operating point (or threshold voltage) of the light emitting element LED may be determined by a material and a thickness of the first emitting layer EL1 disposed between the anode electrode AE and the cathode electrode CE. The operating point of the light emitting element LED may be increased as the thickness of the first emitting layer EL1 is thickened.

Referring to FIG. 3B, a light emitting element LED_1 may include an anode electrode AE, a first emitting auxiliary layer AEL1, a first emitting layer EL1, a charge generation layer EGL, a second emitting layer EL2, a second emitting auxiliary layer AEL2, and a cathode electrode CE.

The first emitting auxiliary layer AEL1 may be disposed on the anode electrode AE, and may include at least one of a hole injection layer and a hole transport layer.

The charge generation layer EGL may be disposed between the first emitting layer EL1 and the second emitting layer EL2.

The charge generation layer EGL may allow charge balance to be maintained in the first emitting layer EL1 and the second emitting layer EL2 by controlling the quantity of charge between the first emitting layer EL1 and the second emitting layer EL2. The charge generation layer EGL may include an n-type layer located adjacent to the first emitting layer EL1 to supply electrons to the first emitting layer EL1 and a p-type layer located adjacent to the second emitting layer EL2 to supply holes to the first emitting layer ELL The second emitting layer EL2 may be disposed on the charge generation layer EGL, and may be substantially identical or similar to the first emitting layer ELL For example, the first emitting layer EL1 may include a first light emitting material (e.g., a blue light emitting material) emitting light of a first color, and the second emitting layer EL2 may include a second light emitting material (e.g., a yellow light emitting material) emitting light of a second color different from the first color.

The second emitting auxiliary layer AEL2 may be disposed on the second emitting layer EL2, and may include at least one of an electron transport layer and an electron injection layer.

The light emitting element LED_1 may have a tandem structure in which the first emitting layer EL1 and the second emitting layer EL2 are stacked (or in which two light emitting elements are connected in series).

A distance between the anode electrode AE and the cathode electrode CE of the light emitting element LED_1 may be greater than that between the anode electrode AE and the cathode electrode CE of the light emitting element LED shown in FIG. 3A, and accordingly, an operating point (or threshold voltage) of the light emitting element LED_1 may be higher than an operating point of the light emitting element LED shown in FIG. 3A. For example, the operating point (or threshold voltage) of the light emitting element LED_1 may be higher by about 30% or more than that the light emitting element LED shown in FIG. 3A.

Since the operating point of the light emitting element LED_1 is higher than an operating point of the light emitting element LED, a higher reference voltage (or second reference voltage) is to be provided to the pixel PX so as to sense the operating point (or change in operating point) of the light emitting element LED_1.

In order to supply a reference voltage sufficiently higher than the operating point of the light emitting element LED_1 to the pixel PX, a higher driving voltage AVDD (or driving power) is to be applied to the data driver 130 (see FIG. 1A and/or FIG. 1B).

According to embodiments, the display device 100 uses the transmitter 150 to supply a desirable reference voltage. Therefore, although the display device 100 includes the pixel PX shown in FIG. 3B, the accuracy in a characteristic of the light emitting element LED_1 can be improved while minimizing an increase in power consumption of the data driver 130.

Figure 4:
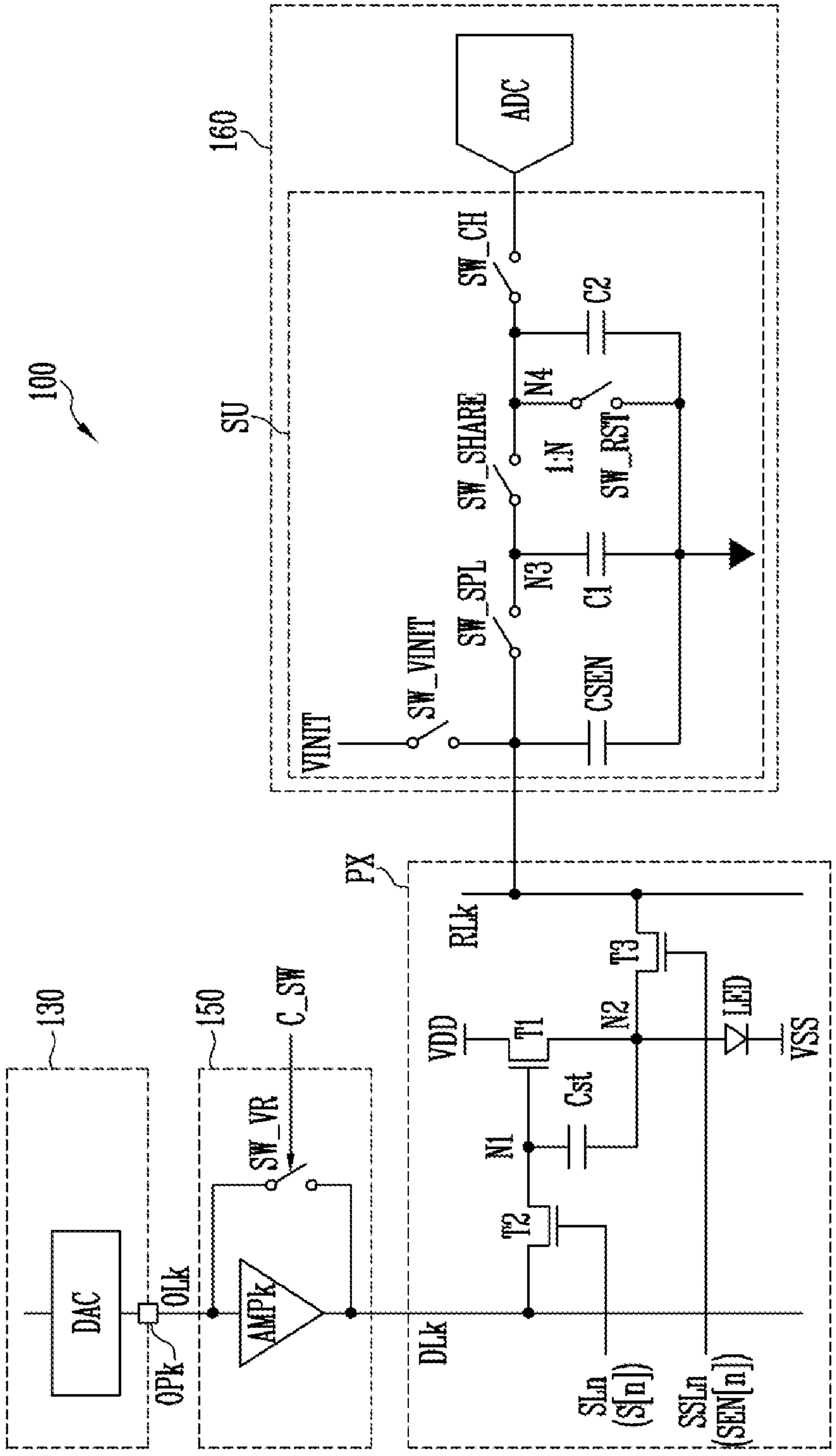
FIG. 4 is a circuit diagram illustrating an example of structures of the display device shown in FIG. 1A.

FIG. 4 is a circuit diagram illustrating an example of the display device shown in FIG. 1A. In FIG. 4, the display device 100 is described using one pixel PX as an example.

Referring to FIGS. 1A, 2, and 4, the pixel PX is substantially identical to the pixel PX described with reference to FIG. 2.

The data driver 130 may include a digital-analog converter DAC. The digital-analog converter DAC may generate a data voltage corresponding to the data value (or grayscale data) included in the image data DATA2 (see FIG. 1A). For example, the digital-analog converter DAC may select one of gamma voltages and output the selected gamma voltage as a data voltage (or data signal).

Although not shown in the drawing, the data driver 130 may further include an output buffer, and may output a data voltage to a kth output line OLk through the output buffer.

The transmitter 150 may include an amplifier AMPk and a bypass switch SW_VR. The amplifier AMPk and the bypass switch SW_VR may constitute one transmission circuit (or amplifying circuit), and the transmitter 150 may include j transmission circuits, respectively corresponding to the data lines DL1 to DLj, respectively corresponding to the output lines OL1 to OLj, and respectively corresponding to the output terminals OP1 to OPj described with reference to FIG. 1A.

The amplifier AMPk may be connected to a kth output terminal OPk (and/or kth output line OLk) of the data driver 130 and the kth data line DLk.

In an example embodiment, the amplifier AMPk may have a gain in a range of about 1.5 to about 3, and may amplify a data voltage (or reference voltage) provided from the data driver 130 by about 1.5 times to about 3 times. For example, the amplifier AMPk may have a gain (or gain value) of about 2.

The bypass switch SW_VR may be connected in parallel to the amplifier AMPk between the kth output terminal OPk and the kth data line DLk, and may operate in response to a switch control signal C_SW. The switch control signal C_SW may be provided from the timing controller 140 as described with reference to FIG. 1A. The bypass switch SW_VR may be connected between an input terminal and an output terminal of the amplifier AMPk, and may be an n-type transistor. For example, the bypass switch SW_VR may be turned on in response to the switch control signal C_SW of a gate-on voltage level. The gate-on voltage level may be a voltage level at which the transistor is turned on. When the bypass switch SW_VR is turned on, the data voltage may be transmitted to the kth data line DLk as it is. For example, the bypass switch SW_VR may be turned off in response to the switch control signal C_SW of a gate-off voltage level. The gate off voltage level may be a voltage level at which the transistor is turned off. The data voltage (or reference voltage) may be amplified by the amplifier AMPk, and the amplified reference voltage (e.g., the second reference voltage described with reference to FIG. 1A) may be provided to the kth data line DLk.

The sensor 160 may be connected to the kth sensing line RLk, and may include a sensing unit SU and an analog-digital converter ADC.

The sensing unit SU may include a sensing capacitor CSEN, a first capacitor C1, a second capacitor C2, an initialization switch SW_VINIT (or first switch), a sampling switch SW_SPL (or second switch), a sharing switch SW_SHARE (or third switch), a reset switch SW_RST (or fourth switch), and an output switch SW_CH (or fifth switch).

The initialization switch SW_VINIT may be connected between a power line to which an initialization voltage VINIT is applied and the kth sensing line RLk. The initialization voltage VINIT may be provided from a separate power supply, and may have a voltage level lower than the operating point of the light emitting element LED. When the initialization switch SW_VINIT is turned on, the initialization voltage VINIT may be applied to the kth sensing line RLk. When the third transistor T3 of the pixel PX is turned on, the initialization voltage VINIT may be applied to the second node N2 of the pixel PX. Since the initialization voltage VINIT has a voltage level lower than the operating point of the light emitting element LED, the light emitting element LED may emit no light even when the first transistor T1 is turned on.

The sensing capacitor CSEN may be connected between the kth sensing line RLk and a reference power source. The reference power source may have a ground voltage. When the initialization switch SW_VINIT is turned off and the third transistor T3 of the pixel PX is turned on, the sensing capacitor CSEN may be charged by a current provided through the second node N2. Therefore, characteristic information of the light emitting element, which is provided through the second node N2, may be stored in the sensing capacitor CSEN.

The sampling switch SW_SPL may be connected between the kth sensing line RLk and the third node N3. The first capacitor C1 may be connected between the third node N3 and the reference power source. While the sampling switch SW_SPL is being turned on, the first capacitor C1 may sample the characteristic information of the light emitting element, which is stored in the sensing capacitor CSEN.

The sharing switch SW_SHARE may be connected between the third node N3 and a fourth node N4, the reset switch SW_RST may be connected between the fourth node N4 and the reference power source, and the second capacitor C2 may be connected between the fourth node N4 and the reference power source. When the sharing switch SW_SHARE is turned on, and the first capacitor C1 and the second capacitor C2 share charges, a node voltage of the fourth node N4 (and a node voltage of the third node N3)

may be changed. The sharing switch SW_SHARE, the reset switch SW_RST, and the second capacitor C2 may serve as a buffer according to operations of the sharing switch SW_SHARE and the reset switch SW_RST. A gain of the buffer may be N (N is an integer greater than 1) even through it varies depending on a capacitance ratio of the first capacitor C1 to the second capacitor C2. Therefore, the sharing switch SW_SHARE, the reset switch SW_RST, and the second capacitor C2 may amplify the node voltage of the third node N3.

The output switch SW_CH may be connected between the fourth node N4 and the analog-digital converter ADC, and may connect the fourth node N4 to an input terminal of the analog-digital converter ADC. Therefore, the node voltage of the fourth node N4 may be applied to the analog-digital converter ADC.

Although not shown in the drawing, the sensing unit SU may further include a capacitor connected between the input terminal of the analog-digital converter ADC and the reference power source to maintain the node voltage of the fourth node N4, which is provided to the analog-digital converter ADC, and an initialization circuit (e.g., a capacitor initialization power source and a switch connecting the capacitor initialization power source to the analog-digital converter ADC) for initializing the input terminal of the analog-digital converter ADC (or the capacitor).

The analog-digital converter ADC may convert a voltage provided to the input terminal thereof into a data value (e.g., a digital code).

In embodiments, the sensing unit SU may include one or more of various circuits (e.g., a sensing circuit that converts a sensing current into a sensing voltage using an amplifier and samples and holds the converted sensing voltage), as long as the circuit(s) can detect a node voltage (or current corresponding thereto) of the second node N2 of the pixel PX.

Figure 5:
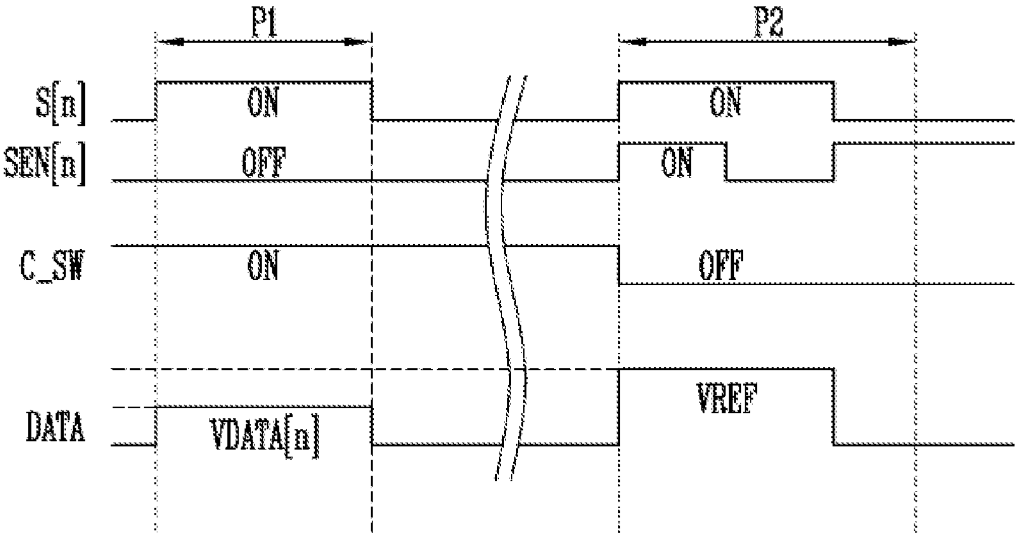
FIG. 5 is a waveform diagram illustrating an example of signals provided in elements of the display device shown in FIG. 4.

FIG. 5 is a waveform diagram illustrating an example of signals provided in the display device shown in FIG. 4.

Referring to FIGS. 1A, 4, and 5, a first period P1 (or display period) may be a period in which the pixel PX emits light and/or a period in which a valid data voltage that allows the pixel PX to emit light is applied (or written) to the pixel PX. A second period P2 (or sensing period) is a period in which a characteristic of the light emitting element in the pixel PX is sensed, and the pixel PX may emit no light in the second period. The first period P1 and the second period P2 may be included in one frame period (e.g., a period in which one frame image is displayed). The first period P1 may precede the second period P2 or may be subsequent to the second period P2 in one frame period.

In the first period P1, the scan signal S[n] may have a gate-on voltage level ON, the sensing control signal SEN[n] may have a gate-off voltage level OFF, and the switch control signal C_SW may have a gate-on voltage level ON. The data voltage DATA in the kth data line DLk may have an nth data voltage level VDATA[n].

The bypass switch SW_VR of the transmitter 150 may be turned on in response to the switch control signal C_SW of the gate-on voltage level ON, and the data voltage DATA output from the data driver 130 may be provided to the kth data line DLk as it is.

The second transistor T2 of the pixel PX may be turned on in response to the scan signal S [n] of the gate-on voltage level ON, the data voltage DATA of the nth data voltage level VDATA[n] may be applied to the first node N1. In addition, the third transistor T3 of the pixel PX may be turned on in response to the sensing control signal SEN[n] of the gate-on voltage level ON, and the initialization voltage VINIT applied to the kth sensing line RL may be provided to the second node N2. Therefore, a voltage (i.e., a data voltage obtained by compensating for a threshold voltage of the first transistor T1) corresponding to the difference between the data voltage DATA and the initialization voltage VINIT may be stored in the storage capacitor Cst. An amount of driving current flowing through the first transistor T1 may be determined corresponding to the voltage stored in the storage capacitor Cst. When the sensing control signal SEN[n] has a gate-off voltage level OFF after the first period P1, the light emitting element LED may emit light with a luminance corresponding to the amount of driving current.

In the second period P2, the scan signal S[n] may partially have the gate-on voltage level ON, the sensing control signal SEN[n] may partially have the gate-on voltage level ON and may partially have the gate-off voltage level OFF, and the switch control signal C_SW may have the gate-off voltage level OFF. In at least a portion of the second period P2, the data voltage DATA in the kth data line DLk may have a reference voltage level VREF.

The bypass switch SW_VR of the transmitter 150 may be turned off in response to the switch control signal C_SW of the gate-off voltage level OFF, the data voltage DATA (or data voltage DATA of a first reference voltage level) may be amplified by the amplifier AMPk, and the amplifier AMPk may output the data voltage DATA of the reference voltage level VREF. As described with reference to FIG. 1A, the reference voltage level VREF may have a voltage level higher than a maximum data voltage level that can be output from the data driver 130.

The second transistor T2 of the pixel PX may be turned on in response to the scan signal S[n] of the gate-on voltage level ON, and the data voltage DATA of the reference voltage level VREF may be applied to the first node N1. The third transistor T3 of the pixel PX may be turned on in response to the sensing control signal SEN[n] of the gate-on voltage level ON. As described with reference to FIG. 4, when the initialization voltage VINIT is applied to the kth sensing line RLk in a portion of the second period P2, the initialization voltage VINIT may be applied to the second node N2 through the third transistor T3. Since the initialization voltage VINIT has a voltage level loser than the operating point of the light emitting element LED, the light emitting element LED may emit no light.

In the state in which the light emitting element LED emits no light, a characteristic (or operating point) of the light emitting element LED may be sensed. For example, when the sensing control signal SEN[n] has the gate-off voltage level OFF, a voltage corresponding to the threshold voltage of the first transistor T1 may be stored in the storage capacitor Cst, and then the scan signal S[n] may have the gate-off voltage level OFF. When the sensing control signal SEN[n] has the gate-on voltage level ON, a current corresponding to the threshold voltage of the light emitting element LED may flow in the kth sensing line RLk through the third transistor T3.

Figure 6:
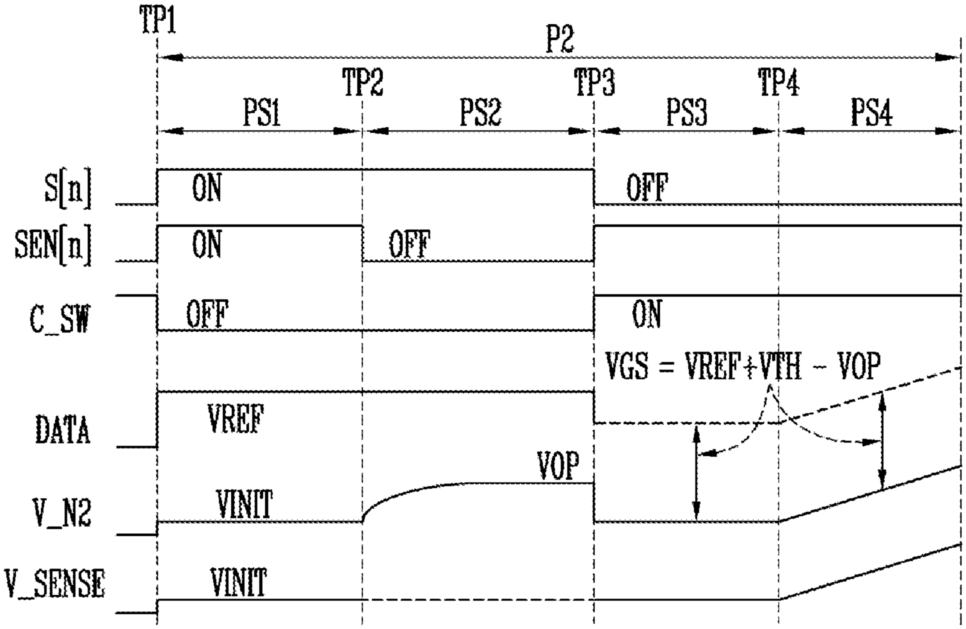
FIG. 6 and FIG. 7 are waveform diagrams illustrating examples of signals provided in elements of the display device shown in FIG. 4.
Figure 7:
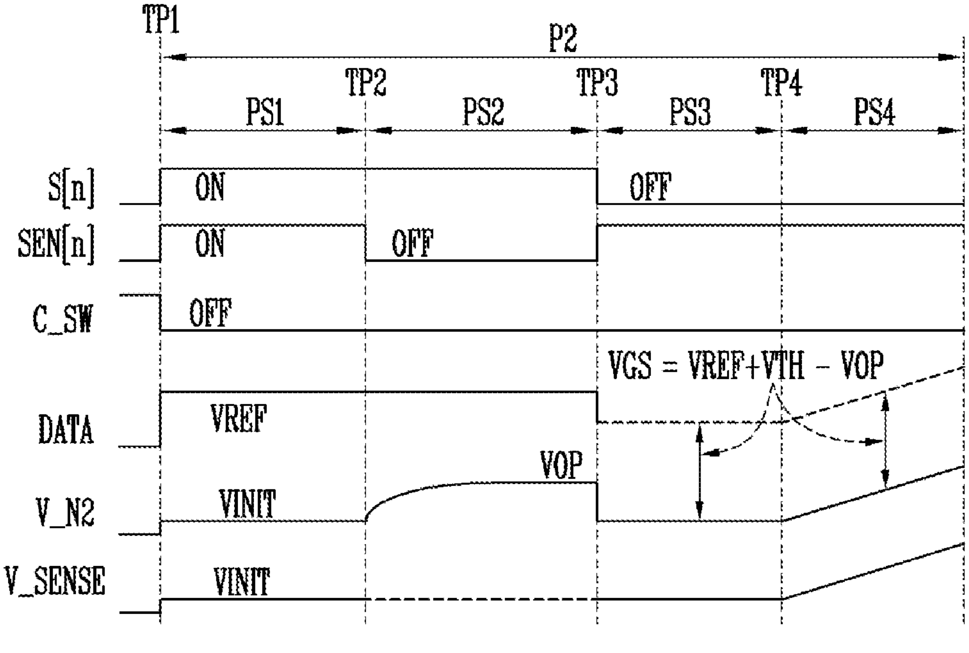

FIGS. 6 and 7 are waveform diagrams illustrating examples of signals provided in the display device shown in FIG. 4. In FIGS. 6 and 7, signals in the second period P2 are illustrated.

Referring to FIGS. 4 to 6, the second period P2 may include a first-sub-period PS1, a second sub-period PS2, a third sub-period PS3, and a fourth sub-period PS4.

At a first time TP1 (at the beginning of the first sub-period PS1 or in the first sub-period PS1), the voltage level of the scan signal S[n] may be changed from the gate-off voltage level OFF to the gate-on voltage level ON. The voltage level of the sensing control signal SEN[n] may be changed from the gate-off voltage level OFF to the gate-on voltage level ON. The voltage level of the switch control signal C_SW may be changed from the gate-on voltage level ON to the gate-off voltage level OFF.

The bypass switch SW_VR of the transmitter 150 may be turned off in response to the switch control signal C_SW of the gate-off voltage level OFF, and the data voltage DATA (or data voltage DATA of the first reference voltage level) output from the data driver 130 may be amplified by the amplifier AMPk, and the amplifier AMPk may output the data voltage DATA of the reference voltage level VREF. The second transistor T2 may be turned on in response to the scan signal S [n] of the gate-on voltage level ON, and the data voltage DATA of the reference voltage level VREF may be applied to the first node N1.

In the first sub-period PS1, the sensor 160 may apply the initialization voltage VINIT to the kth sensing line RLk. For example, the initialization switch SW_VINIT described with reference to FIG. 4 may be turned on, and the initialization voltage VINIT may be applied to the kth sensing line RLk Therefore, a voltage V_SENSE of the kth sensing line RLk may have a voltage level of the initialization voltage VINIT.

Since the third transistor T3 is turned on by the sensing control signal SEN[n] of the gate-on voltage level ON, the initialization voltage VINIT may be applied to the second node N2 of the pixel PX through the kth sensing line RLk Therefore, the node voltage of the second node N2 may be changed to have the voltage level of the initialization voltage VINIT. Since the initialization voltage VINIT has a voltage level lower than an operating point VOP of the light emitting element LED, the light emitting element LED may emit no light.

Subsequently, at a second time TP2 (at the beginning of the second sub-period PS2 or in the second sub-period PS2), the voltage level of the sensing control signal SEN[n] may be changed to the gate-off voltage level OFF.

The third transistor T3 may be turned on in response to the sensing control signal SEN[n] of the gate-off voltage level OFF, and the second node N2 of the pixel PX may be in a floating state.

During the second sub-period PS2, the first transistor T1 supplies a current to the second node N2 in response to the data voltage DATA of the reference voltage level VREF, and therefore, a node voltage V_N2 of the second node N2 may be changed. For example, while a parasitic capacitance of the light emitting element LED is being charged, the node voltage V_N2 of the second node N2 may be increased up to the operating point VOP of the light emitting element LED, and information (e.g., the reference voltage level VREF— the operating point VOP+a threshold voltage VTH of the first transistor T1) on the operating point VOP of the light emitting element LED may be stored in the storage capacitor Cst.

Subsequently, at a third time TP3 (at the beginning of the third sub-period PS3 or in the third sub-period PS3), the voltage level of the scan signal S[n] may be changed to the gate-off voltage level OFF, and the second transistor T2 may be turned off. The first node N1 may be in the floating state, the node voltage of the first node N1 may be changed along the node voltage V_N2 of the second node N2 by the storage capacitor Cst.

The voltage level of the sensing control signal SEN[n] may be changed to the gate-on voltage level ON. Therefore, the third transistor T3 may be turned on, and the second node N2 may be connected to the kth sensing line RLk Since the voltage V_SENSE of the kth sensing line RLk is maintained as the initialization voltage VINIT by the sensing capacitor CSEN of the sensor 160, the node voltage V_N2 of the second node N2 may be changed to become equal to the initialization voltage VINIT. The node voltage of the first node N1 may be changed corresponding to the change in the node voltage V_N2 of the second node N2.

Due to the storage capacitor Cst, a voltage (i.e., a gate-source voltage VGS) between the first electrode and the second electrode of the first transistor T1 may be "the reference voltage level VREF+the threshold voltage VTH of the first transistor T1—the operating point VOP" (i.e., VGS=VREF+VTH−VOP).

Subsequently, at a fourth time TP4 (at the beginning of the fourth sub-period PS4 or in the fourth sub-period PS4), the sensor 160 may stop the supply of the initialization voltage VINIT to the kth sensing line RLk. For example, the initialization switch SW_INIT described with reference to FIG. 4 may be turned off in the second sub-period PS2.

The first transistor T1 may supply a current corresponding to the gate-source voltage VGS to the second node N2. Accordingly, the node voltage V_N2 of the second node N2 and the voltage V_SENSE of the kth sensing line RLk, and information on the operating point VOP of the light emitting element LED may be stored in the sensing capacitor CSEN.

Since the reference voltage level VREF is set sufficiently higher than the operating point VOP by the transmitter 150 (see FIG. 4), the node voltage V_N2 of the second node N2 and the voltage V_SENSE of the kth sensing line RLk may be relatively rapidly increased, more accurate information on the operating point VOP of the light emitting element LED may be stored in the sensing capacitor CSEN.

The sensor 160 may sample the information on the operating point VOP of the light emitting element LED using the sampling switch SW_SPL and the first capacitor C1, which are described with reference to FIG. 4, may amplify and hold the information on the operating point VOP using the sharing switch SW_SHARE, the reset switch SW_RES, and the capacitor C2, which are described with reference to FIG. 4, and may read the information on the operating point VOP as a digital code through the analog-digital converter ADC described with reference to FIG. 4.

As described with reference to FIG. 6, in the second period P2, the display device 100 amplifies a reference voltage and then supplies the reference voltage to the pixel PX through the transmitter 150, so that a characteristic of the light emitting element LED can be more accurately sensed using the amplified reference voltage (i.e., the reference voltage level VREF).

FIG. 6 illustrates that the switch control signal C_SW has the gate-on voltage level ON in the third sub-period PS3 and the fourth sub-period PS4.

In embodiments, as shown in FIG. 7, the switch control signal C_SW may have the gate-off voltage level OFF in the third sub-period PS3 and the fourth sub-period PS4. Therefore, the bypass switch SW_VR of the transmitter 150 may be turned off, and the data voltage DATA may be amplified through the amplifier AMPk. Since the second transistor T2 is in a state in which it is turned off, the second transistor T2 may have no influence on sensing a characteristic of the light emitting element LED of the corresponding pixel.

According to embodiments, a display device amplifies a reference voltage for sensing a characteristic of the light emitting element and provides the reference voltage to the pixel through the transmitter, so that the accuracy in sensing a characteristic of the light emitting element can be improved while minimizing an increase in power consumption of the data driver and minimizing a decrease in resolution.

While example embodiments have been described, various modifications and changes can be made to the described embodiments without departing from the scope defined by the appended claims.

What is claimed is:

1. A display device comprising:

a pixel electrically connected to a first data line;

a data driver configured to output a data voltage within a first voltage range through a first output terminal in a first period and a second period; and a transmitter configured to transmit a first instance of the data voltage provided through the first output terminal to the first data line in the first period and to provide a reference voltage by amplifying a second instance of the data voltage provided through the first output terminal in the second period, wherein in the first period, a voltage level of the data voltage applied to the first data line is equal to a voltage level of the first instance of the data voltage at the first output terminal of the data driver, and in the second period, a voltage level of the reference voltage applied to the first data line is greater than a voltage level of the second instance of the data voltage at the first output terminal of the data driver and is out of the first voltage range.

2. The display device of claim 1, wherein the pixel includes a light emitting element emitting light in response to the first instance of the data voltage, and wherein the light emitting element emits light in the first period and emits no light in the second period.

3. The display device of claim 1, wherein the voltage level of the reference voltage is in a range of about 1.5 times of a maximum voltage level of the data voltage to about 2.5 times of the maximum voltage level of the data voltage.

4. The display device of claim 1, wherein the transmitter includes:

an amplifier electrically connected between the first output terminal of the data driver and the first data line, and a bypass switch electrically connected in parallel to the amplifier between the first output terminal of the data driver and the first data line.

5. The display device of claim 4, wherein a gain of the amplifier is about 2, and wherein the amplifier amplifies the second instance of the data voltage by about 2 times of a maximum voltage level of the data voltage.

6. The display device of claim 4, wherein the bypass switch is turned on in the first period and is turned off in at least a portion of the second period.

7. The display device of claim 6, further comprising:

a sensing circuit; and a readout line electrically connected to the sensing circuit, wherein the readout line is connected to a first electrode of a light emitting element of the pixel, and wherein characteristic information of the light emitting element is output to the sensing circuit through the readout line in the second period.

8. The display device of claim 7, wherein the pixel includes:

a first transistor including a first electrode electrically connected to a first power line, a second electrode electrically connected to a second node, and a gate electrode electrically connected to a first node;

a second transistor including a first electrode electrically connected to the first data line, a second electrode electrically connected to the first node, and a gate electrode electrically connected to a scan line;

a third transistor including a first electrode electrically connected to the second node, a second electrode electrically connected to the readout line, and a gate electrode electrically connected to a sensing control line;

a capacitor between the first node and the second node; and the light emitting element electrically connected between the second node and a second power line.

9. The display device of claim 8, wherein the second period includes a first sub-period, a second sub-period, and a third sub-period in sequence, and wherein, in the first sub-period, a gate-on voltage is applied to the scan line, the gate-on voltage is applied to the sensing control line, the bypass switch is turned off, and an initialization voltage is applied to the readout line.

10. The display device of claim 9, wherein, in the second sub-period, a gate-off voltage is applied to the sensing control line.

11. The display device of claim 10, wherein, in the second sub-period, a node voltage of the second node is changed from a voltage level of the initialization voltage to a voltage level of a threshold voltage of the light emitting element.

12. The display device of claim 10, wherein, in the third sub-period, the gate-off voltage is applied to the scan line, and the gate-on voltage is applied to the sensing control line.

13. The display device of claim 12, wherein, in the third sub-period, the bypass switch is turned on.

14. The display device of claim 12, wherein, in the third sub-period, the bypass switch is turned off.

15. The display device of claim 1, wherein the pixel includes a light emitting element, and wherein the light emitting element includes a first electrode, a second electrode overlapping the first electrode, and a first organic emitting layer disposed between the first electrode and the second electrode.

16. The display device of claim 15, wherein the light emitting element further includes a second organic emitting layer disposed between the first organic emitting layer and the second electrode.

* * * * *